United States Patent [19]

Utgoff

[11] 4,154,190
[45] May 15, 1979

[54] CALIBRATED AIRCRAFT DIRECTIONAL GYRO FOR INDICATING HOLDING PATTERN ENTRY PROCEDURE

[76] Inventor: Paul E. Utgoff, 999 Hidden Lake Dr., North Brunswick, N.J. 08902

[21] Appl. No.: 815,586

[22] Filed: Jul. 14, 1977

[51] Int. Cl.² .................. G01C 19/00; G08G 5/00
[52] U.S. Cl. .................................. 116/335; 33/15 C; 73/178 J; 116/DIG. 43; 244/1 R
[58] Field of Search ....... 116/129 E, 129 F, DIG. 43; 244/1 R; 73/178 T; 33/15 B, 15 C

[56] References Cited

U.S. PATENT DOCUMENTS

| | | | |
|---|---|---|---|
| 2,158,925 | 5/1939 | Braswell | 116/129 E |
| 2,613,350 | 10/1952 | Kellogg | 73/178 R |
| 3,496,769 | 2/1970 | Vietor | 73/178 T |
| 3,967,236 | 6/1976 | Dietrich | 116/DIG. 43 |
| 4,020,787 | 5/1977 | Castro et al. | 73/178 T |

FOREIGN PATENT DOCUMENTS 631628 11/1961 Canada ................. 116/129 R

Primary Examiner—Daniel M. Yasich
Attorney, Agent, or Firm—Norman N. Popper; Daniel H. Bobis

[57] ABSTRACT

A directional gyro for aircraft having on its stationary face plate, color zones referable separately to portions of the 360° movable directional scale; each color zone indicating a particular entry procedure (direct, parallel, or tear drop) for the preselected radial.

9 Claims, 4 Drawing Figures

0°- 70°
RED

70°- 250°
BLUE

250°- 360°
YELLOW

CALIBRATED AIRCRAFT DIRECTIONAL GYRO FOR INDICATING HOLDING PATTERN ENTRY PROCEDURE

BACKGROUND OF INVENTION

1. Field of Invention

This invention relates generally to aviation instrumentation, and particularly to an indicating means for advising a pilot which of three entry procedures (direct, parallel, or tear drop) should be selected to enter a holding pattern.

2. Prior Art

The determination of the proper entry procedure ordinarily involves the pilot making mental calculations. With the increasing number of gauges, meters, signals, controls, and air traffic, the distractions from accurate mental calculations are vastly increased and the possibility of error is multiplied. In accordance with instrument flight rules, a pilot may be called to enter a holding pattern when air space is congested. The Federal Aviation Administration defines a holding pattern as "A predetermined maneuver which keeps an aircraft within a specified air space - - - "

Entry into and flying a holding pattern requires flying (1) to the holding fix; (2) one of three predetermined entry procedures; (3) a first 180° turn which places the aircraft on the outbound leg of the holding pattern; (4) the outbound leg; (5) a second 180° turn which places the aircraft on the inbound leg of the holding pattern; (6) the inbound leg; (7) the pattern is repeated until the aircraft is released. This maneuver is continued until the conditions requiring the holding pattern no longer prevail and the pilot is authorized to proceed. The three holding pattern entry procedures are designated by the terms "direct", "parallel", and "tear drop". The Federal Aviation Administration issues the Airman's Information Manual particularly describing these procedures.

The following quotation is from the Airman's Information Manual:

(a) Parallel Procedure—Parallel holding course, turn left, and return to holding fix or intercept holding course.

(b) Teardrop Procedure—Proceed on outbound track of 30° (or less) to holding course, turn right to intercept holding course.

(c) Direct Entry Procedure—Turn right and fly the pattern.

(see exhibit attached to paper filed Mar. 27, 1978 from which the foregoing is quoted.)

The particular type of procedure pursued by the aircraft, can be either of the standard type, in which right hand turns are made in the pattern or the non-standard type in which left hand turns are made in the pattern. The pilot knows whether the holding pattern and entry will be standard or non-standard. The pilot determines the correct entry procedure according to the size of the angle determined by the angle between his immediate heading to the holding fix and the radial of the holding pattern at the holding fix. The Federal Aviation Administration defines a holding fix as "a specified fix as a reference point in establishing and maintaining the position of an aircraft while holding." It will be seen that in addition to the needs for observation and control of the aircraft, the pilot must mentally calculate this difference, and having made the calculation must select one of the three pre-determined entry procedures corresponding to that angle. This mental calculation is done by observing the aircraft's directional gyro, which is required by the Federal Aviation Administration to be installed on all aircraft operating on instrument flight rules. The directional gyroscope is an adaptation of the mariner's magnetic compass so constructed as not to be susceptible to turning errors or outside forces. The invention enables the pilot to make a determination by inspection of the gyro, without engaging in the mental exercise of arithmetical calculation that detracts from his attention to controls.

SUMMARY OF INVENTION

To the directional gyro face plate is added a multi-colored circumferential band, around the fixed index which index is usually in the form of an aircraft viewed from above, with the nose of the aircraft serving as the index from which the flight course indicated by the directional gyro is shown. Beyond the peripheral color coded band, which is stationary, the dial of the directional gyro rotates, and on this dial, the heading is read at the index (the nose of the aircraft).

The peripheral color coded zones of the band consist of a pair of concentric circles, the outer circle used for standard entry procedure, and the inner circle for non-standard entry procedure. The outer peripheral circle is colored with hue #1 from 0° to 70°; that outer circle from 70° to 250° is color coded to hue #2; and that outer circle for the remainder of its extent from 250° to 360° is color coded to hue #3.

The inner circle, starting again from 0° to 110°, moving clockwise is color coded with hue #3; from 110° to 290°, the inner circle moving clockwise is color coded with hue #2; further from 290° to 360° moving clockwise, the inner circle is color coded with hue #3. The outer circle indicates the three different types of standard entries and the inner circle indicates the three types of non-standard entries. Hue #1 advises the pilot that when he reaches the holding fix to perform the tear drop entry; hue #2 informs him to perform the direct entry pattern; and hue #3 informs the pilot to perform a parallel entry.

The pilot uses the invention by directing his aircraft toward the holding fix. He then observes the color code indicated by the index at the inner or outer circle opposite the prescribed radial. When arriving at the holding fix, he selects the corresponding entry pattern referenced by the hue indicated by the prescribed radial and performs the entry pattern (tear drop, direct, or parallel) corresponding to that hue.

DRAWINGS

These objects and advantages as well as other objects and advantages may be achieved by the device shown by way of illustration in the drawings in which.

PREFERRED EMBODIMENT

Figure 1:
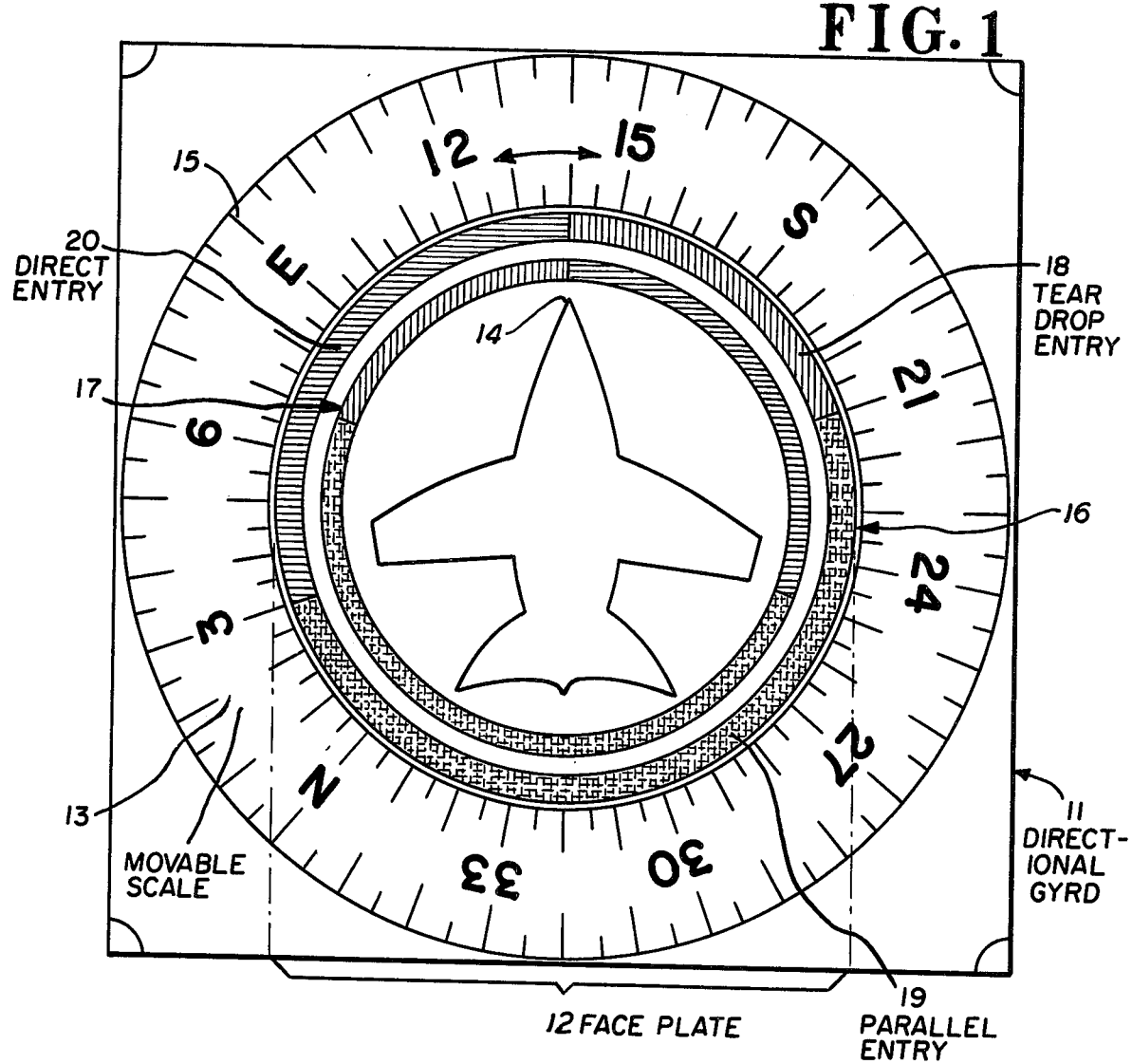
FIG. 1 is a top plan view of a color coded directional gyro face plate.

Referring now to the drawings in detail, the present invention provides a directional gyro 11 having a stationary face plate 12 and a rotating magnetic scale 13 which moves in accordance with terrestrial magnetic domination.

On the immovable face plate of the directional gyro adjacent to the movable scale 13, there is an index 14 which, by reference to the movable scale 13 indicates the heading by means of the angular calibrations 15 on the scale 13 shown thereon. Thus, in FIG. 1, the heading of the aircraft is read to be 140°. The index 14 is fixed and the directional gyro scale 13 moves to show the aircraft heading. Peripherally with respect to the index 14, there are two concentric circles 16, 17. Both the outer circle 16 and the inner circle are stationary on the face plate 12 and are color coded as follows:

| THE OUTER CIRCLE 16 (Clockwise) | |
| --- | --- |
| 1) First Section 18 from 0° to 70° | Hue #1 (red) |
| 2) Second Section 19 from 70° to 250° | Hue #2 (blue) |
| 3) Third Section 20 from 250° to 360° (0°) | Hue 3 (yellow) |
| THE INNER CIRCLE 17 (Clockwise) | |
| 1) First Section 21 from 0° to 110° | Hue #3 (yellow) |
| 2) Second Section 22 from 110° to 290° | Hue 2 (blue) |
| 3) Third Section 23 from 290° to 360° (0°) | Hue #1 (red) |

Figure 2:
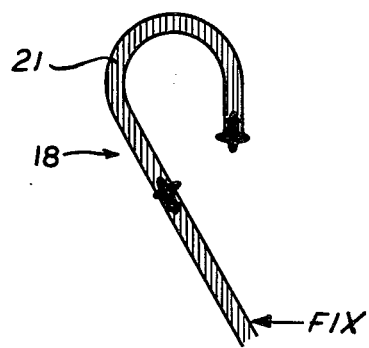
FIG. 2, FIG. 3 and FIG. 4 are each color codes identified with the particular entry procedure indicated by the color codes on the directional gyro face plate.
Figure 3:
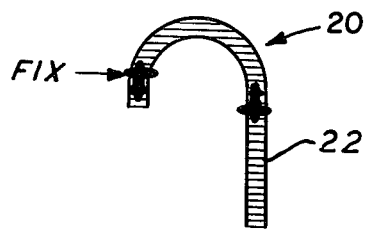
Figure 4:
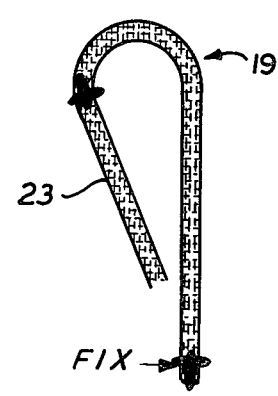

References to hues #1, #2, and #3 represent colors which are different from each other, and are arbitrarily chosen. In the drawings, hue #1 represents the color red; hue #2 represents the color blue; and hue #3 represents the color yellow, all as defined by cross-hatching. Each hue represents a characteristic approach pattern as shown in FIGS. 2, 3, and 4, which constitute the codes signifying the type of entry pattern. The outer circle 16 is the reference for determining the particular entry procedure for a standard type holding pattern. The inner circle 17 is the reference for the pilot to determine the particular entry procedure for a non-standard type holding pattern.

In FIG. 1, the pilot is approaching the holding fix on radial 140, and is directed by the ground controller to enter a right hand turn holding pattern on radial 190 when he reaches the holding fix. A glance at the outer margin or circle 16 discloses that section 18 red (hue #1) is opposite radial 190. Without any calculation, the pilot immediately knows that red means a tear drop entry, or he may reference FIGS. 2, 3, and 4, and see that the flight path 21 in FIG. 2 is red and the entry procedure is the illustrated tear drop design. If the entry radial were 50°, the corresponding section 20 of the outer circle would be observed as blue and FIG. 3 discloses blue flight path 22, signifying a standard direct entry. If the entry radial were 340°, the outer circle 16 would show the color yellow opposite radial 340. FIG. 4 shows a yellow flight path 23 indicating a standard parallel entry procedure.

It will be seen that without any mathematical calculation, but simply by reference to hue, the pilot may, either from memory or by reference to the hue indicated by the code shown in FIGS. 2, 3, or 4, thereby determine which of the three entry procedures he is to pursue when he reaches the holding fix.

While reference has been had to color coding which is the scheme illustrated in the drawings, the several areas of the face plate may be made distinctive by printing thereon, the title of the holding pattern, instead of the identifying color, thus: TEAR DROP, PARALLEL, or DIRECT for each particular entry in the appropriate color coded area.

A reading of the face plate opposite the prescribed holding radial by a pilot without any mathematical calculation, automatically determines the proper selection of one of the three entry procedures.

What is claimed is:
1. A colored indication plate on a directional gyro for indicating holding pattern entry procedures comprising,
   a. a directional gyro with, a movable calibrated directional scale on the gyro,
   b. a stationary face plate on the gyro,
   c. a plurality of distinctive areas arranged in segments of a circle on the stationary face plate of the gyro, each one of said segments referable to a controller assigned holding radial on the movable calibrated directional scale, whereby a pilot may read which approach entry pattern procedure to adopt from the identity of the distinctive segment opposite the assigned holding radial.

2. A colored indication plate on a directional gyro for indicating holding pattern entry procedures comprising:
   a. the device according to claim 1 in which the plurality of distinctive areas are arranged in an outer circle and an inner circle, the one circle corresponding to a standard entry procedure, and the other circle corresponding to a non-standard entry procedure.

3. A colored indication plate on a directional gyro for indicating holding pattern entry procedures comprising:
   a. the device according to claim 1 in which the distinctive areas in each circle have a particular coloration distinguishing one area from another.

4. A colored indication plate on a directional gyro for indicating holding pattern entry procedures comprising:
   a. the device according to claim 1,
   b. a first segment of the distinctive areas extending from 0° to 70°,
   c. a second segment of the distinctive areas extending from 70° to 290°,
   d. a third segment of the distinctive areas extending from 290° to 360°,
   e. the distinctive areas defining a standard holding pattern entry.

5. A colored indication plate on a directional gyro for indicating holding pattern entry procedures comprising:
   a. the device according to claim 4,
   b. the first, second and third segments each having coloration distinguishing each from the others.

6. A colored indication plate on a directional gyro for indicating holding pattern entry procedures comprising:
   a. the device according to claim 1,
   b. a first segment of the distinctive areas extending from 0° to 110°,
   c. a second segment of the distinctive areas extending from 110° to 290°,
   d. a third segment of the distinctive areas extending from 290° to 360°,
   e. the distinctive areas defining a non-standard holding pattern entry.

7. A colored indication plate on a directional gyro for indicating holding pattern entry procedures comprising:
   a. the device according to claim 6,
   b. the first, second and third segments each having coloration distinguishing each from the others.

8. A colored indication plate on a directional gyro for indicating holding pattern entry procedures comprising:
 a. the device according to claim 1 and,
 b. separate displays depicting holding pattern entry procedures by flight patterns,
 c. the holding pattern entry procedures in the separate displays depicting tear drop, direct, and parallel entry procedures,
 d. each entry procedure flight path depicted distinctively and corresponding with a particular distinctive area on the stationary face plate.

9. A colored indication plate on a directional gyro for indicating holding pattern entry procedures comprising:
 a. the device according to claim 1, and
 b. the distinctive areas being marked respectively direct, parallel and tear drop.

* * * * *